United States Patent
Kwon et al.

(10) Patent No.: US 10,764,790 B2
(45) Date of Patent: *Sep. 1, 2020

(54) COMMUNICATION METHOD AND FRAME STRUCTURE FOR A COORDINATOR DEVICE, SOURCE DEVICE AND RELAY DEVICE IN A WIRELESS SYSTEM

(71) Applicant: ELECTRONICS AND TELECOMMUNICATIONS RESEARCH INSTITUTE, Daejeon (KR)

(72) Inventors: Hyoung Jin Kwon, Daejeon (KR); Yong Sun Kim, Daejeon (KR); Kap Seok Chang, Daejeon (KR); Seung Eun Hong, Daejeon (KR); Sung Geun Jin, Daejeon (KR); Woo Yong Lee, Daejeon (KR); Hyun Kyu Chung, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/904,279

(22) Filed: Feb. 23, 2018

(65) Prior Publication Data

US 2018/0184335 A1 Jun. 28, 2018

Related U.S. Application Data

(63) Continuation of application No. 14/841,613, filed on Aug. 31, 2015, now Pat. No. 9,906,987, which is a
(Continued)

(30) Foreign Application Priority Data

Mar. 11, 2010 (KR) .......................... 10-2010-0021942

(51) Int. Cl.
*H04B 7/24* (2006.01)
*H04J 1/00* (2006.01)
(Continued)

(52) U.S. Cl.
CPC ........ *H04W 28/26* (2013.01); *H04B 7/15542* (2013.01); *H04B 7/15557* (2013.01);
(Continued)

(58) Field of Classification Search
None
See application file for complete search history.

(56) References Cited

U.S. PATENT DOCUMENTS 8,830,917 B1 9/2014 Zhang et al.
8,891,497 B1 11/2014 Vleugels
(Continued)

FOREIGN PATENT DOCUMENTS

CN 101296020 A 10/2008
EP 2012484 A1 1/2009
(Continued)

OTHER PUBLICATIONS

Xueli an et al., "Extending WPANs to Support Multi-hop Communication with QoS Provisioning", 2010 7th IEEE Consumer Communications and Networking Conference, Jan. 12, 2010, pp. 1-6.
(Continued)

*Primary Examiner* — Bob A Phunkulh
(74) *Attorney, Agent, or Firm* — Rabin & Berdo, P.C.

(57) ABSTRACT

Provided is a communication method of a coordinator in a wireless networks system that uses a reservation-based media access control (MAC). The communication method includes receiving, from a source device, a frame that requests a reservation resource for a relay device, to enable a frame that the source device transmits to a destination device to be relayed via the relay device, and allocating the
(Continued)

reservation resource for the relay device, in response to the request.

10 Claims, 11 Drawing Sheets

Related U.S. Application Data continuation of application No. 13/634,104, filed as application No. PCT/KR2011/001745 on Mar. 11, 2011, now Pat. No. 9,125,105.

(51) Int. Cl.

| | | |
|---|---|---|
| *H04W 28/26* | (2009.01) | |
| *H04W 16/26* | (2009.01) | |
| *H04W 88/04* | (2009.01) | |
| *H04B 7/155* | (2006.01) | |
| *H04W 28/16* | (2009.01) | |
| *H04W 40/22* | (2009.01) | |
| *H04W 72/04* | (2009.01) | |
| *H04W 84/04* | (2009.01) | |
| *H04W 84/12* | (2009.01) | |

(52) U.S. Cl.
CPC .......... *H04W 16/26* (2013.01); *H04W 28/16* (2013.01); *H04W 40/22* (2013.01); *H04W 88/04* (2013.01); *H04B 7/15592* (2013.01); *H04W 72/0406* (2013.01); *H04W 84/047* (2013.01); *H04W 84/12* (2013.01)

(56) References Cited

U.S. PATENT DOCUMENTS

| | | |
|---|---|---|
| 2004/0196819 A1 | 10/2004 | Lin et al. |
| 2005/0086329 A1 | 4/2005 | Datta et al. |
| 2005/0197148 A1 | 9/2005 | Ali et al. |
| 2005/0237956 A1 | 10/2005 | Kuperschmidt et al. |
| 2006/0251119 A1* | 11/2006 | Ramesh ............... H04L 45/38 370/468 |
| 2007/0019573 A1 | 1/2007 | Nishimura |
| 2007/0195818 A1 | 8/2007 | Stephenson et al. |
| 2007/0248063 A1 | 10/2007 | Habetha |
| 2008/0025324 A1 | 1/2008 | Sawada |
| 2008/0068991 A1 | 3/2008 | Ponauswamy |
| 2008/0080414 A1 | 4/2008 | Thubert et al. |
| 2008/0137581 A1 | 6/2008 | Doppler et al. |
| 2008/0186901 A1 | 8/2008 | Itagaki et al. |
| 2008/0188222 A1 | 8/2008 | Oh |
| 2008/0219222 A1 | 9/2008 | Lo et al. |
| 2008/0247350 A1 | 10/2008 | Tsai et al. |
| 2008/0259857 A1 | 10/2008 | Zheng |
| 2009/0005083 A1 | 1/2009 | Hoshino et al. |
| 2009/0010199 A1 | 1/2009 | Adachi et al. |
| 2009/0016290 A1 | 1/2009 | Chion et al. |
| 2009/0219853 A1 | 9/2009 | Hart et al. |
| 2009/0238108 A1 | 9/2009 | Nakae et al. |
| 2009/0268657 A1 | 10/2009 | Alexiou et al. |
| 2009/0279553 A1 | 11/2009 | Horu et al. |
| 2009/0286546 A1 | 11/2009 | Hwang et al. |
| 2009/0290528 A1 | 11/2009 | Kwon et al. |
| 2010/0002656 A1 | 1/2010 | Ji et al. |
| 2010/0099352 A1 | 4/2010 | Lee et al. |
| 2010/0103045 A1 | 4/2010 | Liu et al. |
| 2010/0142417 A1 | 6/2010 | Kim et al. |
| 2010/0157826 A1 | 6/2010 | Yu et al. |
| 2010/0157955 A1 | 6/2010 | Liu et al. |
| 2010/0165910 A1 | 7/2010 | Mathews et al. |
| 2010/0215027 A1 | 8/2010 | Liu et al. |
| 2011/0014911 A1 | 1/2011 | Baldemair et al. |
| 2011/0058514 A1 | 3/2011 | Lee et al. |
| 2011/0080865 A1 | 4/2011 | Tsai et al. |
| 2011/0141968 A1 | 6/2011 | Trainin |
| 2011/0194519 A1 | 8/2011 | Habetha |
| 2011/0212684 A1 | 9/2011 | Nam et al. |
| 2011/0216691 A1 | 9/2011 | Lim et al. |
| 2011/0268015 A1 | 11/2011 | Xiao et al. |

FOREIGN PATENT DOCUMENTS

| | | |
|---|---|---|
| EP | 1 762 020 B1 | 10/2009 |
| JP | 2000-244522 A | 9/2000 |
| JP | 2005-005869 A | 1/2005 |
| WO | WO-2009-088937 A2 | 7/2009 |

OTHER PUBLICATIONS

J. K Choi et al., "Review on QoS issues in IEEE 802.11 W-LAN", 2006 The 8th International Conference Advanced Communication Technology (ICACT 2006), Feb. 22, 2006, pp. 2109-2113.

Hyoungjin Kwon et al.; "Anti-blocking Mechanism by Relay"; IEEE P802.15; Jul. 15, 2008.

I. Lakkis et al.; "Beamforming Terminology"; IEEE802.15.3c; Mar. 12, 2009.

Azadeh Ettefagh et al "Throughout performance of two way relaying in IEEE 802.11 Networks", Wireless Communication Systems, 2007.ISWCS 2007. 4th International Symposium on, IEEE, Piscataway, NJ, USA, Oct. 1, 2007 (Oct. 1, 2007), pp. 829-833, XP031166886,ISBN: 978-1-4244-0978-5 * Sections II-III*.

* cited by examiner

| Order | Information |
|---|---|
| 1 | Category |
| 2 | Action |
| 3 | Dialog Token |
| 4 | TSPEC |
| 5-n | TCLAS(optional) |
| n+1 | TCLAS Processing(optional) |

FIG. 11

| Element ID | Length | Allocation 1 ⌒1110 | Allocation 2 ⌒1120 | Allocation 3 ⌒1130 | ... |
|---|---|---|---|---|---|
| 1 octet | 1 octet | | | | ... |

| Allocation 1 1110 | Allocation Control | Source ID | Destination ID | Ta | Tb | ... |
|---|---|---|---|---|---|---|

| Allocation 2 1120 | Allocation Control | Source ID | Relay ID | Ta | Tb | ... |
|---|---|---|---|---|---|---|

| Allocation 3 1130 | Allocation Control | Relay ID | Destination ID | Ta | Tb | ... |
|---|---|---|---|---|---|---|

COMMUNICATION METHOD AND FRAME STRUCTURE FOR A COORDINATOR DEVICE, SOURCE DEVICE AND RELAY DEVICE IN A WIRELESS SYSTEM

CROSS-REFERENCE TO THE RELATED APPLICATIONS

This is a continuation of co-pending U.S. application Ser. No. 14/841,613, filed on Aug. 31, 2015, and allowed on Nov. 15, 2017, which is a continuation of U.S. application Ser. No. 13/634,104, filed on Sep. 11, 2012 (now U.S. Pat. No. 9,125,105, issued on Sep. 1, 2015), which is, in turn, a national stage of PCT application number PCT/KR2011/001745, filed Mar. 11, 2011. Furthermore, this application claims the foreign priority benefit of Korean application number 10-2010-0021942, filed Mar. 11, 2010. The disclosures of these prior applications are incorporated herein by reference.

TECHNICAL FIELD

The present invention relates to a communication method of a relay device and a coordinator of a wireless network system that supports a reservation-based channel access, such as a wireless local area network (WLAN) environment and a wireless personal area network (WPAN) environment, and relates to a frame structure that is used for relaying data using a relay device in a network.

BACKGROUND ART

In a wireless local area network (WLAN), a data frame may be transmitted via a coordinator, such as an access point (AP), or may be directly transmitted based on a peer-to-peer scheme. Transmission performed, via the coordinator, using an up-link or a down-link may compete with another device in a network for a channel and thus, the throughput of the transmission may decrease.

Accordingly, the standard 802.11e may directly transmit a frame using a direct link setup (DLS) mode between devices without using the AP and thus, may increase a channel usage efficiency more than twofold.

Although the DLS mode is used, when a channel condition becomes deficient due to multiple paths in the network, attenuation, interference, and the like, the throughput of a wireless network may decrease, and may not satisfy a case that requires a quality of service (QoS), such as multi-media streaming.

Therefore, when the DLS mode is insufficient, the standard may need to support relaying of the frame using another device in the network, as opposed to using the coordinator. There may be a desire for an addressing method of a new WLAN, for relaying the frame using another device.

When a reservation-based media access control (MAC) scheme that requests and receives a resource from a coordinator is used to more stably transmit the frame, a reservation resource may not need to be classified into a reservation resource that supports relaying and a reservation resource that does not support the relaying.

The reservation resource may indicate a device that requests the resource and a peer device with which the device requesting the resource plans to communicate, and may allow only the indicated devices to perform communication. Accordingly, when a relay, for example, a relay device, receives and transmits a peer-to-peer communication between two devices, the relay may also need to be able to perform transmission and reception of a frame with the two devices in the corresponding reservation resource. Therefore, there is a desire for a method that requests the reservation resource, and allocates the reservation resource to the relay device to perform relaying in the corresponding network.

DISCLOSURE OF INVENTION

Technical Goals

An aspect of the present invention may provide a structure of a frame that is used for relaying data using a relay device in a wireless network system that supports a reservation-based channel access, and provides a communication method of a coordinator that reserves and allocates a wireless resource that allows relaying, a source device, and a relay device.

Another aspect of the present invention also provides a communication method of a source device, a relay device, and a coordinator that announces that a currently transmitted frame is a frame relayed via a relay device, to a pair of devices participating in a peer-to-peer communication scheme in a WLAN, the relay device, and other devices, and provides a frame structure.

Another aspect of the present invention also provides a communication method of a source device, a relay device, and a coordinator that requests and allocates a wireless resource to enable another device different from the coordinator to relay a frame, and provides a frame structure.

Technical Solutions

According to an aspect of an exemplary embodiment, there is provided a communication method of a coordinator of a wireless network system that uses a reservation-based media access control (MAC), the method including receiving, from a source device, a frame that requests a reservation resource for a relay device, to enable a frame that the source device transmits to a destination device to be relayed via the relay device, and allocating the reservation resource for the relay device, in response to the request.

According to another aspect of an exemplary embodiment, there is provided a communication method of a source device, the method including transmitting a frame that requests, from a coordinator, a reservation resource for a relay device to enable a frame transmitted to a destination device to be transmitted via the relay device, receiving information associated with the reservation resource from the coordinator, in response to the frame that requests the reservation resource for the relay device, and changing an address included in the frame transmitted to the destination device in the reservation resource, based on at least one of a relay scheme of the relay device and a type of the frame relayed via the relay device.

According to still another aspect of an exemplary embodiment, there is provided a communication method of a relay device, the method including receiving information associated with a reservation resource allocated from a coordinator, verifying an identification (ID) of a source device and an ID of a destination device that are included in the information associated with the reservation resource, and relaying, to the destination device, a frame that the source device transmits, using the reservation resource based on the verification.

When the frame is a response frame with respect to the received first frame or the received second frame, the method may include setting an address 1 of the response frame as an address 2 field address value of the received first frame or the received second frame, and setting the address 2 of the response frame as an address 1 field address value of the received first frame or the received second frame.

According to yet another aspect of an exemplary embodiment, there is provided a communication method of a destination device, the method including receiving information associated with a reservation resource allocated from a coordinator, verifying an ID of a source device and an ID of the destination device that are included in the information associated with the reservation resource, and receiving, based on the verification, a frame that the source device transmits or the relay device transmits in the reservation resource.

When the frame is a response frame with respect to a received first frame or a received second frame, the method may include setting the address 1 of the response frame as an address 2 field address value of the received first frame or the received second frame, and setting the address 2 of the response frame as an address 1 field address value of the received first frame or the received second frame.

Effects

According to an embodiment of the present invention, a relay control field may be inserted in a frame and thus, the frame may be indicated as a frame that is relayed to a source device, a destination device, and a relay device, without changing an addressing framework of a wireless local area network (WLAN).

According to an embodiment of the present invention, a relay device may identify a frame only based on an media access control (MAC) header, by providing an addressing method appropriate for each relaying scheme of the relay device, and using an addressing method that distinguishes a management frame for obtaining information associated with a relay link and a data frame transmitted via a detour.

BRIEF DESCRIPTION OF DRAWINGS

FIG. 11 is a diagram illustrating a frame structure to be used for requesting reservation of a resource and allocating the reservation resource.

BEST MODE FOR CARRYING OUT THE INVENTION

Figure 1:
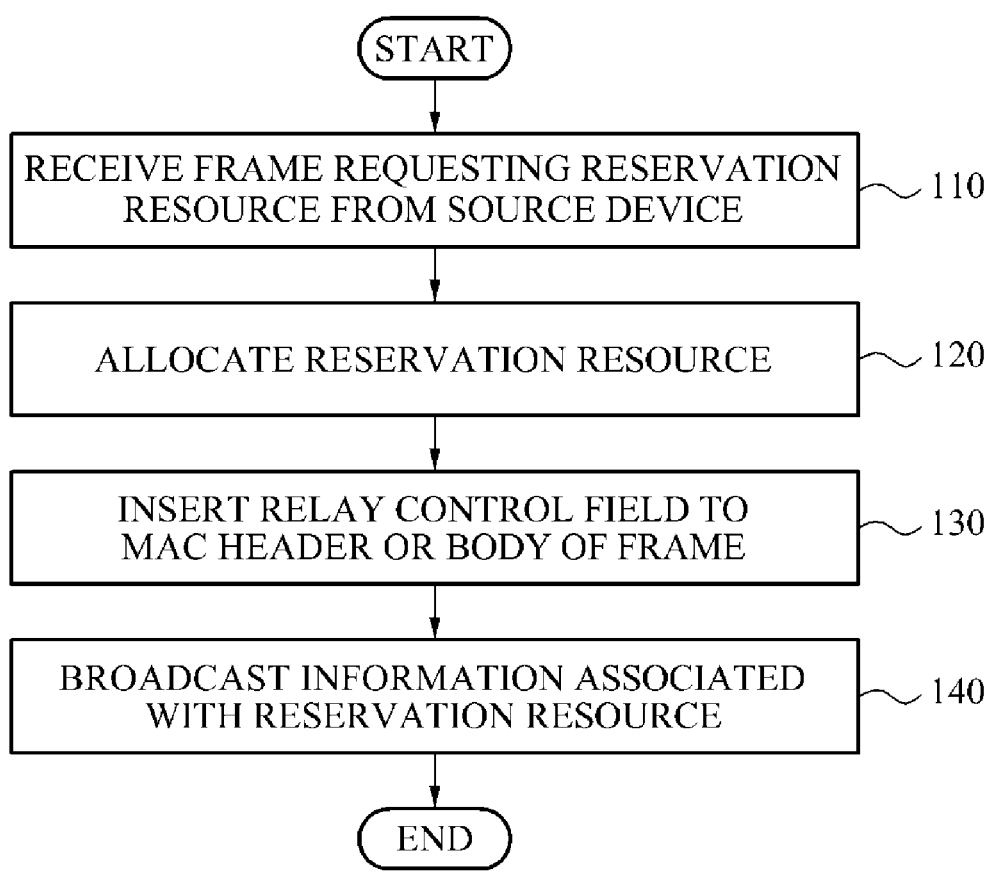
FIG. 1 is a flowchart illustrating a communication method of a coordinator according to an embodiment of the present invention.

Although a few exemplary embodiments of the present invention have been shown and described, the present invention is not limited to the described exemplary embodiments, wherein like reference numerals refer to the like elements throughout.

A wireless network that follows the IEEE 802.11 standard may be configured as one of an infrastructure basic service set (BSS) and an independent BSS (IBSS), that is, a so called ah-hoc network.

The infrastructure BSS may include an access point (AP) and a distributed system (DS), and may generally use the AP during all communication processes including a communication between devices. The infrastructure BSS may generally transmit a frame via the AP. Conversely, the IBSS may form a network only including devices without the AP, and may not allow access to the DS. The IBSS does not include the AP and thus, an initiator may directly communicate with a peer device using a contention-based channel access, such as a distributed coordination function (DCF), in all communication processes.

A wireless local area network (WLAN) may define a direct link setting (DLS) procedure for a direct communication between Q device, for example QoS devices. The Q device may receive and transmit a DLS request frame and a DLS response frame via a quality of service (QoS) AP or a legacy AP and may set a direct link between the Q devices.

The IEEE 802.11ad Task Group associated millimeter-wave of 60 GHz band, which is under discussion for standardization, may support directional communication and QoS. The IEEE 802.11ad Task Group may include the DS in the infrastructure BSS and may exclude a portion associated with accessing the Internet, to improve a power saving and a spectrum management. The IEEE 802.11ad Task Group may include a coordinator to manage resources and a network, and may newly introduce a personal IBSS (PBSS) that includes a peer-to-peer communication function of the IBSS.

A PBSS control point of the PBSS may be a coordinator that supports most functions of the AP excluding a function that supports communication with another network by connecting to the DS.

Example embodiments of the present invention may provide a method of transmitting data via another device, for example, a relay device, in a network, as opposed to via a DLS path or the coordinator. In this example, it is assumed that a protocol to be used for relay transmission using the relay device is predetermined and setting of the protocol is completed.

Example embodiments of the present invention may provide an addressing method with respect to a frame that relays data when the data is relayed using a relay device, and a method of requesting a resource from a coordinator and receiving the requested resource.

First, the addressing method with respect to the frame that relays the data will be described.

Throughout the specifications, devices used in relay transmission may be a source device, a destination device, and a relay device, respectively. The device may include a concept of a station (STA).

When the source device transmits a frame to the destination device via the relay device, an address of the relay device may need to be written in the frame, based on a relay scheme. In a wireless random access network (WRAN), when data is transmitted from a device in the BSS to a wired device connected to the DS or to a device included in another BSS, addresses of at least three devices may be used.

When all the source devices, the destination deice, and the relay device are wireless devices, and are included in a single BSS there is a desire for a new format for addressing. A data frame, a control frame, and a management frame that may not require link information may be expressed as a first frame, and a link information request frame and a relay operation setting and changing request frame that may require link information may be expressed as a second frame.

FIG. 1 illustrates a communication method of a coordinator according to an embodiment of the present invention.

Referring to FIG. 1, the coordinator may be a coordinator of a wireless network system that uses a reservation-based media access control (MAC), and may receive, from a source device, a frame that requests a reservation resource for a relay device, to enable a frame that the source device transmits to a destination device to be relayed via the relay device in operation 110.

In this example, the frame that requests the reservation resource for the relay device may indicate that the reservation resource is for the frame that is transmitted via the relay device. The frame that requests the reservation resource for the relay device may include an initiator identification (ID), that is, an ID of the source device that requests the reservation resource from the coordinator, a responder ID, that is, an ID of the destination device with which the source device plans to communicate, and information associated with the source device and the destination device.

The coordinator may allocate the reservation resource for the relay device, in response to the request for reservation resource from the source device in operation 120.

In operation 120, the coordinator may provide an extended schedule element to a service period (SP), to allocate the reservation resource for the relay device In this example, the extended schedule element may include, as a sub-field, at least one allocation field including a source association ID (AID) area for the source device and a destination AID area for the destination device.

The SP and the extended schedule element will be described with reference to FIGS. 2 and 3.

In this example, the source device, the destination device, and the relay device may perform a relay link setup (RLS) process in advance and thus, the source device, the destination device, and the relay devices may recognize AIDs with each other in advance. When the source device successfully performs the RLS process, the source device may transmit an RLS announcement frame to other devices. Resultantly, the coordinator may allocate a resource based on information included in the RLS announcement frame received from the source device.

The coordinator may insert a relay control field with respect to the relay device, in an MAC header or a body of the frame in operation 130 so that the source device and the destination device recognize that the frame is relayed via the relay device. The relay control field will be described with reference to FIG. 5.

The coordinator may broadcast information associated with the reservation resource using a beacon frame or an announcement frame in operation 140. In this example, the information associated with the reservation resource may include the ID of the source device and the ID of the destination device.

Figure 2:
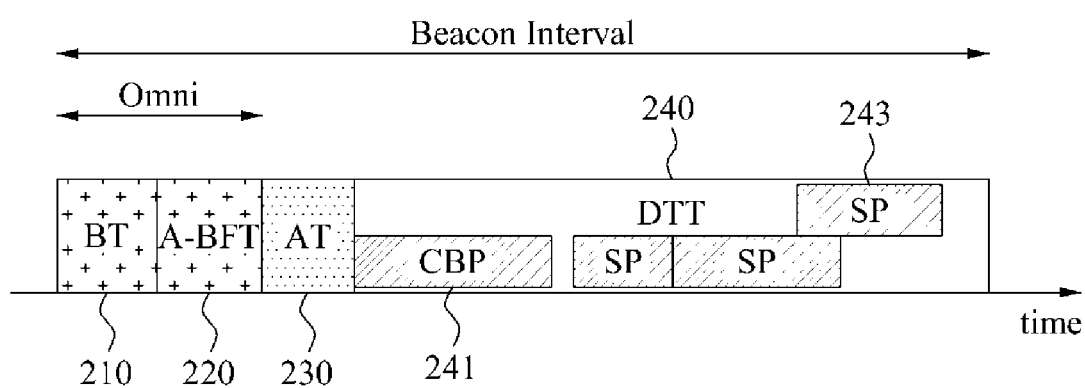
FIG. 2 is a diagram illustrating a structure of a wireless local area network (WLAN) beacon interval.

FIG. 2 illustrates a structure of a WLAN beacon interval.

Referring to FIG. 2, a WLAN beacon interval may include a beacon time (BT) 210, an association beam forming training (A-BFT) 220, and announcement time (AT) 230, and a data transfer time (DTT) 240.

The BT 210 may denote a time for detecting new devices, for example, stations, and requesting a resource from the coordinator.

The A-BFT 220 may denote a time for beamforming between the coordinator, for example, an AP and a PBSS control point (PCP), and other devices, for example, a source device, a destination device, and a relay device.

The AT 230 may denote a time where the coordinator, such as the AP or the PCP, announce allocated information to devices in the network using the beacon frame or the announcement frame.

The DTT 240 may include a contention-based period (CBP) and a SP where devices exchange frames.

The allocation field and the extended schedule element that are allocated to the beacon frame or the announce frame transmitted by the coordinator, such as the AP or the PCP, will be described.

Figure 3:
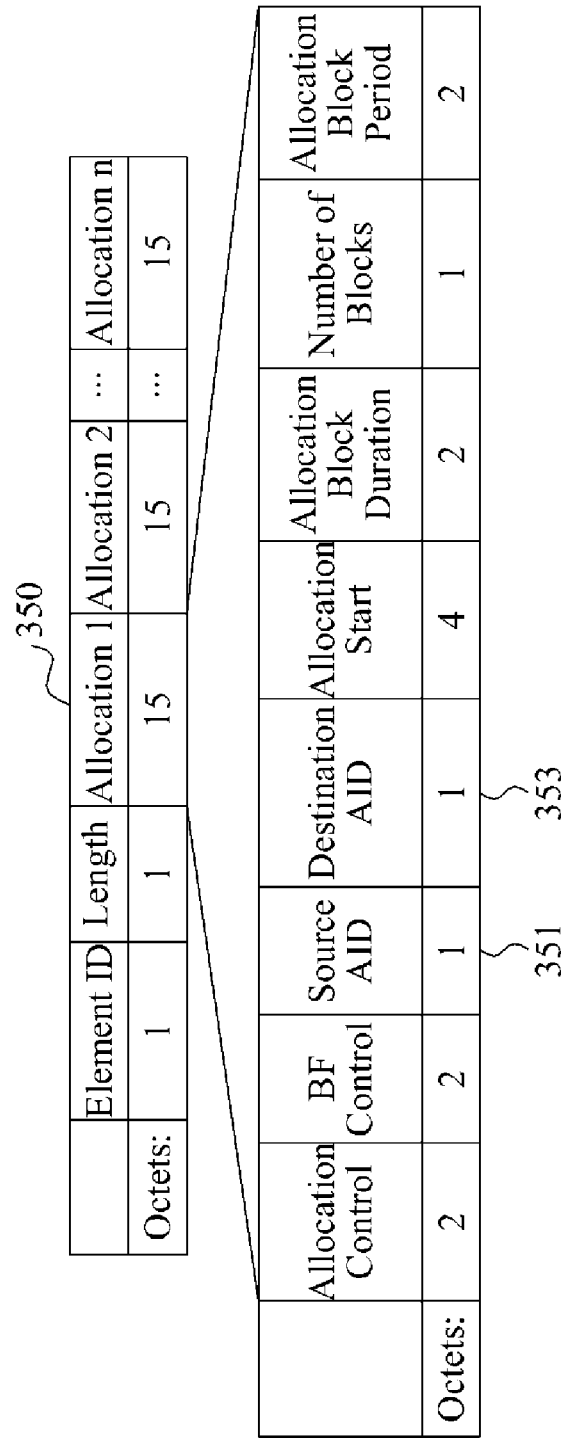
FIG. 3 is a diagram illustrating an allocation field and an extended schedule element for providing a service period (SP) of FIG. 2.

FIG. 3 illustrates an allocation field and an extended schedule element for providing the service period (SP) of FIG. 2.

Referring to FIG. 3, the extended schedule element may include, as a sub-field, an allocation field 350 including a source AID area 351 for a source device and a destination AID area 353 for a destination device.

The coordinator may record an address of the source device in the source AID area 351, and may record an address of the destination device in the destination AID area 353 and thus, the relay device may recognize the source device that requests relaying of a frame and the destination device that is to receive the frame.

Figure 4:
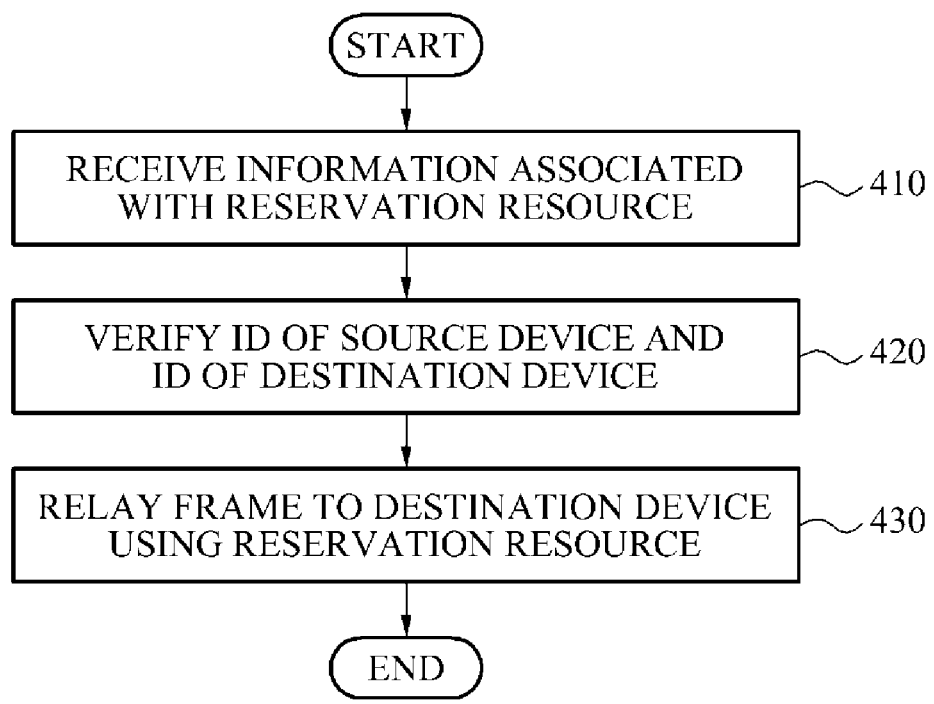
FIG. 4 is a flowchart illustrating a communication method of a relay device according to an embodiment of the present invention.

FIG. 4 illustrates a communication method of a relay device according to an embodiment of the present invention.

The relay device may receive information associated with reservation resource allocated from the coordinator in operation 410. In this example, the information associated with the reservation resource may be recognized by a beacon frame or an announcement frame transmitted from the coordinator.

The relay device may verify an ID of the source device and an ID of the destination device included in the information associated with the reservation resource in operation 420. The relay device may verify whether the ID of the source device and the ID of the destination device are identical with respective IDs of devices that establish relay links with the relay device. In this example, the ID of the source device and the ID of the destination device may correspond to the AID of the source device and the AID of the destination device, respectively.

In operation 430, the relay device may relay a frame transmitted from the source device to the destination device, using the reservation resource based on the verification of operation 420.

The relay device may change an address 1 and an address 2 included in an MAC header based on at least one of a relay scheme of the relay device or a type of the frame relayed via the relay device. The address 2 may be an address of an initiator corresponding to a device requesting communication, and the address 1 may be an address of a responder corresponding to a device with which the initiator plans to communicate.

When the relay scheme of the relay device is a full duplex amplify and forward (FD AF) scheme, the type of the frame is a relay operation setting and changing request frame or a link information request frame that may require information associated with a corresponding link, and the frame is transmitted via an R-D link between the relay device and the destination device, the relay device may set, as the address 1, an address of the destination device, and may set, as the address 2, an address of the relay device.

When the relay scheme of the relay device is a half duplex decode and forward (HD DF) scheme, the addressing method of the relay device for each type of the frame may be provided as follows.

When the type of the frame is one of a data frame, a control frame, and a management frame, and the frame is transmitted via the R-D link, the relay device may set, as the address 1, an address of the destination device, and may set, as the address 2, an address of the source device.

When the type of the frame is a relay operation setting and changing request frame or a link information request frame that may require information associated with a corresponding link, and the frame is transmitted via the R-D link, the relay device may set, as the address 1, the address of the destination, and set, as the address 2, the address of the relay device.

When the type of the frame is a response frame, and the frame is transmitted via the R-D link, the relay device may set, as the address 1, the address of the relay device, and may set, as the address 2, the address of the destination device.

In addition, when a communication scheme that transmits the frame via the relay device is a cooperation communication, the addressing method for each type of the frame may be provided as follow.

When the type of the frame is one of the data frame, the control frame, and the management frame, and the frame is transmitted via the R-D link, the relay device may set, as the address 1, the address of the destination device, and may set, as the address 2, the address of the source device.

When the type of the frame is the relay operation setting and changing request frame or the link information request frame that may require information associated with a corresponding link, and the frame is transmitted via the R-D link, the relay device may set, as the address 1, the address of the destination device, and may set, as the address 2, the address of the relay device.

When the type of the frame is a response frame and the frame is transmitted via the R-D link, the relay device may set, as the address 1, the address of the source address between the relay device and the destination device, and may set, as the address 2, the address of the destination device.

Figure 5:
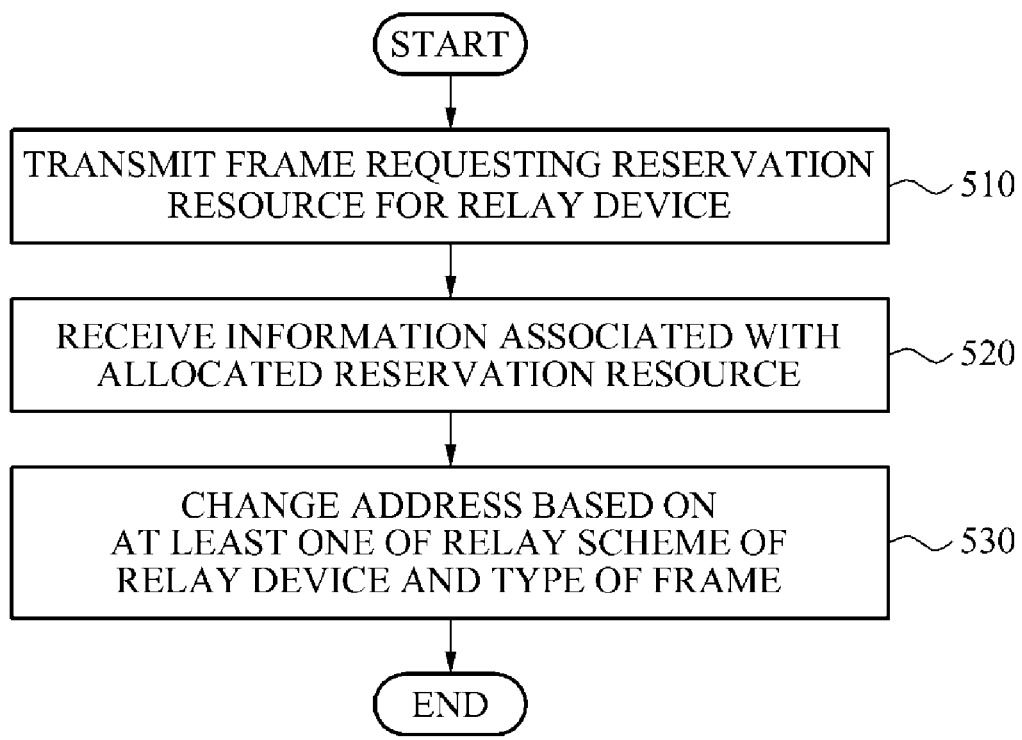
FIG. 5 is a flowchart illustrating a communication method of a source device according to an embodiment of the present invention.

FIG. 5 illustrates a communication method of a source device according to an embodiment of the present invention.

In operation 510, the source device may transmit, to the coordinator, a frame requesting a reservation resource for a relay device, to enable the frame transmitted to the destination device to be transmitted via the relay device.

The source device may receive, from the coordinator, information associated with the reservation resource, in response to the frame requesting the reservation resource in operation 520.

The source device may change an address included in the frame based on at least one of a relay scheme of the relay device and the frame relayed via the relay device in operation 530.

In operation 530, the source device may change addresses of devices that are included in a MAC header of the frame based on at least one of the relay scheme of the relay device and the type of the frame relayed via the relay device.

The addresses of the devices included in the MAC header of the frame may include an address 1 and an address 2. The address 1 is an address of an initiator corresponding to a device requesting communication and the address 2 is an address of a responder corresponding to a device with which the initiator plans to communicate.

The relay scheme of the relay device may be a FD AF scheme and an HD DF scheme. The type of the frame relayed via the relay device may be a data frame, a control frame, a management frame, a relay operation setting and changing request frame, and a link information request frame that requires information associated with a corresponding link, and the like.

The information request frame may be a type of the management frame. However, unlike a general management frame, the information request frame may require the information associated with the corresponding link and thus, the information request frame may be defined as a frame different from the management frame.

The information associated with a corresponding link may include information associated with an S-R link between the source device and the relay device, and information associated with an R-D link between the relay device and the destination device.

Examples of the link information request frame may include a resource list server (RLS) request/response, link margin request/response, and the like.

When the relay scheme of the relay device is the FD AF scheme, and the type of the frame is one of the data frame, the control frame, and the management frame, the source device may set the address of the destination device as the address 1 and may set the address of the source device as the address 2.

When the relay scheme of the relay device is the FD AF scheme, the type of the frame is the relay operation setting and changing request frame or the link information request frame that may require information associated with a corresponding link, and the frame is transmitted via the S-R link, the source device may set, as the address 1, an address of the relay device, and may set, as the address 2, an address of the source device.

When the relay scheme of the relay device is the HD DF scheme, the addressing method for each type of the frame may be provided as follows.

When the type of the frame is one of the data frame, the control frame, and the management frame, and the frame is transmitted via the S-R link, the source device may set, as the address 1, the address of the relay device, and may set, as the address 2, the address of the source device.

When the type of the frame is the relay operation setting and changing request frame or the link information request frame that may require information associated with a corresponding link and the frame is transmitted via the S-R link, the source device may set, as the address 1, the address of the relay device, and may set, as the address 2, the address of the source device.

When the type of the frame is a response frame and the frame is transmitted via the S-R link, the source device may set, as the address 1, the address of the source device, and may set, the address 2, the address of the relay device.

In addition, when a communication scheme that transmits the frame via the relay device is a cooperation communication, the addressing method for each type of the frame may be provided as follows.

When the type of the frame is one of the data frame, the control frame, and the management frame and the frame is transmitted via the S-R link, the source device may set, as the address 1, the address of the destination device, and may set, as the address 2, the address of the source device.

When the type of the frame is the relay operation setting and changing request frame or the link information request frame that may require information associated with a corresponding link and the frame is transmitted via the S-R link, the source device may set, as the address 1, the address of the relay device, and may set, as the address 2, the address of the source device.

When the type of the frame is the response frame and the frame is transmitted via the S-R link, the source device may set, as the address 1, the address of the source device, and may set, as the address 2, the address of the destination device.

In the cooperation communication, when the relay device transmits a frame generated by the relay device, the relay device may write, in corresponding addresses, the address of the source device and the address of the destination device excluding the address of the relay device.

More examples for the addressing method based on at least one of the relay scheme and the type of the frame will be described with reference to FIG. 8.

Figure 6:
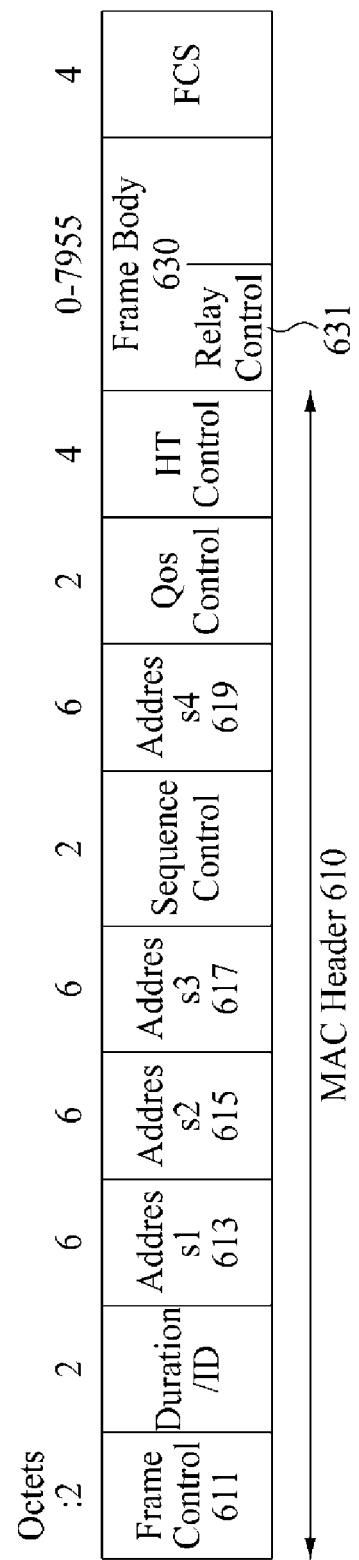
FIG. 6 is a diagram illustrating a media access control (MAC) frame format and interpretation of addressing fields according to an embodiment of the present invention.

FIG. 6 illustrates a MAC frame format and interpretation of addressing fields according to an embodiment of the present invention.

Referring to FIG. 6, the MAC frame format may include a MAC header 610, and a frame body 630 for data to be transmitted. The MAC header 610 may include a frame control field 611 to control a frame, a duration ID filed to indicate a length of a duration of the frame, an address 1 613 to set an address of an initiator corresponding to a device requesting communication for transmission of the frame, and an address 2 615 to set an address of a responder corresponding to a device with which the initiator plans to communicate.

The frame body 630 may include a relay control field 631 to indicate that the corresponding frame is a frame relayed via the relay device. The MAC header 610 may further include an address 3 617 and an address 4 619 which are associated with the relay device and a BSSID, for relaying the frame.

The MAC frame format for a data frame transmission in the standard 802.11n may need four addresses 613, 615, 617, and 619 which are associated with the source device, the destination device, and the relay device and the BSSID. Therefore, the relay control field 631 may be newly defined to indicate that the corresponding frame is a frame relayed via the relay device.

The relay control filed 631 may be defined in the MAC header 610 of the frame when the MAC header 610 includes a valid bit. When the MAC header 610 of the frame does not include the valid bit, the relay control field 631 may be inserted in a first octet of the frame body 631.

Figure 7:
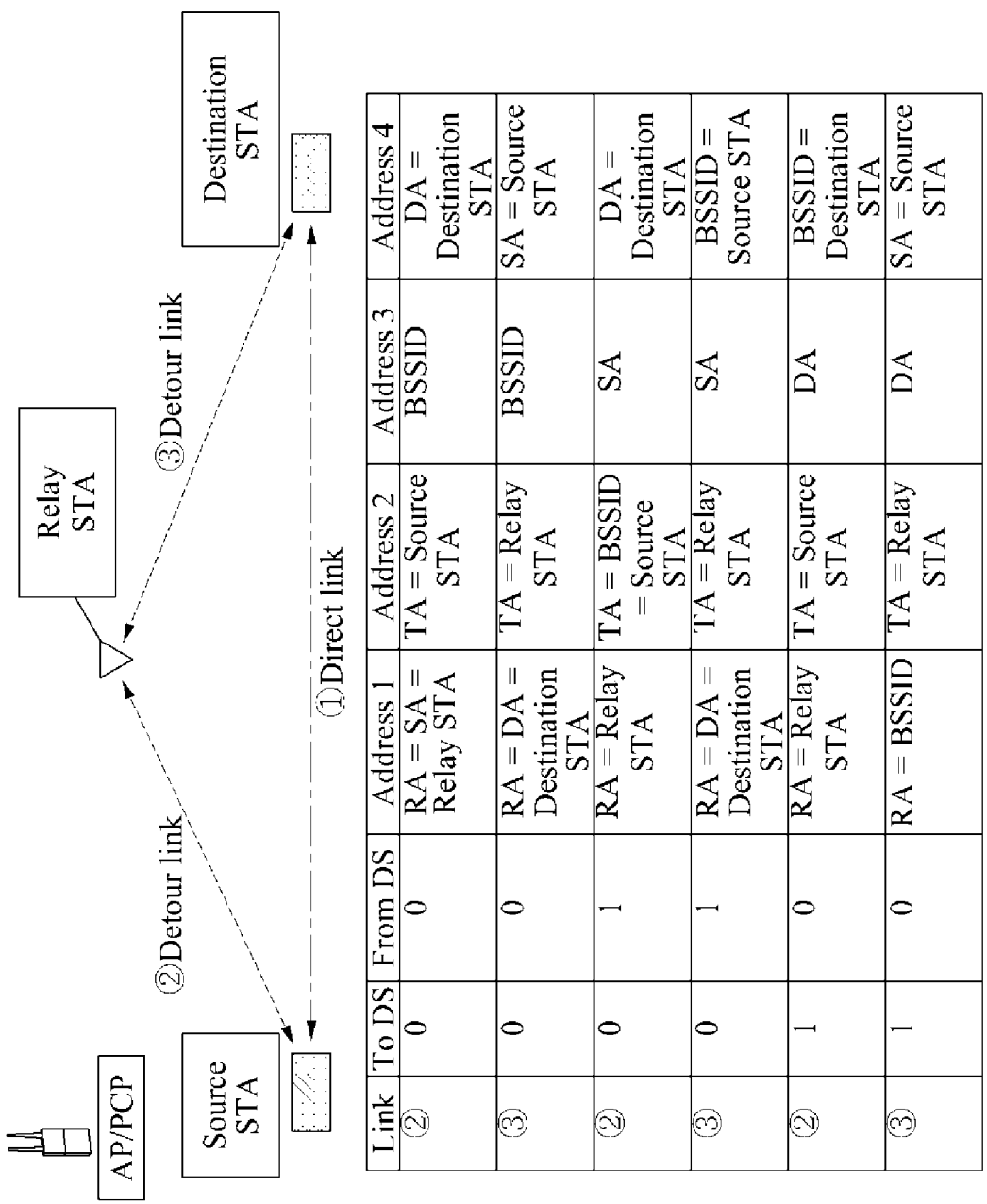
FIG. 7 is a diagram illustrating a method of interpreting addressing fields when a data frame is transmitted using a relay device according to an embodiment of the present invention.

FIG. 7 illustrates a method of interpreting addressing fields when a data frame is transmitted using a relay device according to an embodiment of the present invention.

When the frame format of FIG. 6 is used, each field is interpreted as shown in a table of FIG. 7. ① Direct link may denote a direct link. Although the direct link may transmit data without using the relay device, may use the frame format of FIG. 6.

② Detour link and ③ Detour Link may denote relay links. An address coding method may be different based on whether the relay link is an S-R link (② Detour link) or an R-D link (③ Detour Link). An existing address coding method may be different in a To DS field and a From DS field. Accordingly, when the relay link is used, the addressing fields may be changed based on the table of FIG. 7.

When four addresses are used in the same manner as a case of FIG. 6, the table of FIG. 7 may be appropriate for transmission of the data frame. However, the table of FIG. 7 may be inappropriate for transmission of a control frame, a management frame, and an action frame that uses less than four addresses.

In an embodiment of the present invention, the four addresses may be implicitly used. In this example, it is assumed that the relay device may be aware, in advance, that a frame transmitted to the relay device is a frame to be exchanged between the source device and the destination device, and the relay device performs relaying in a non-contention based period, as opposed to a contention-based period reserved by a coordinator in advance.

In a case where the implicit addressing is used, examples of the addressing method that is changed based on a type of the relayed frame or a relay scheme of the relay device will be described.

First, when the relay scheme of the relay device is an FD AF scheme, the relay device may transmit, to the destination device, the corresponding frame, without correcting an address of the data frame, an address of the control frame, and an address of the management frame excluding several management frames.

Therefore, when the relay scheme of the relay device is the FD AF scheme, a result may be the same as a result of a case where the frame is transmitted using a direct link. Direct link (①): Address 1=Destination STA Address, Address 2=Source STA Address, Address 3=BSSID Full Duplex AF Relay
  Frame type: the data frame, the control frame, the management frame (excluding a link information request frame or a relay operation setting and changing request frame)
  Detour link (②, ③): Address 1=Destination STA Address, Address 2=Source STA Address, Address 3=BSSID
  Frame type: the link information request frame or the relay operation setting and changing request frame (for example, RLS request/response, Link Margin request/response, and the like)
  being the same as the HD DF scheme
  Detour link (②): Address 1=Relay STA Address, Address 2=Source STA Address, Address 3=BSSID
  Detour link (③): Address 1=Destination STA Address, Address 2=Relay STA Address, Address 3=BSSID Second, when the relay scheme of the relay device is the HD DF scheme, all frames, such as the data frame, the control frame, the management frame, and the like, may record an address of a device for transmission and an address of a device for reception as an address 1 and an address 2, respectively.

Half Duplex DF Relay
   Detour link (②): Address 1=Relay STA Address, Address 2=Source STA Address, Address 3=BSSID
   Detour link (③): Address 1=Destination STA Address, Address 2=Relay STA Address, Address 3=BSSID Third, a communication scheme that transmits the frame via the relay device is the cooperation communication.

Cooperation Communication
   Frame type: the data frame, the control frame, and the management frame (excluding link information request frame or the relay operation setting and changing request frame)
   Detour link (②): Address 1=Relay STA Address, Address 2=Source STA Address, Address 3=BSSID
   Detour link (③): Address 1=Destination STA Address, Address 2=Source STA Address, Address 3=BSSID In this example, even though the HD DF scheme is used, the data frame, the control frame, and the management frame excluding several management frames may record, as the address 1, the address of the source device, as opposed to the address of the relay device, in an R-D link between the relay device and the destination device. In this example, even though an operation or addressing in an S-R link between the source device and the relay device is the same as the HD DF scheme, the address of the source device is recorded as the address 1 to perform chase combining in the destination device.

Fourth, when the type of the frame is the link information request frame or the relay operation setting and changing request frame, that is, the management frames excluded from the cooperation communication, may record an address of a device for transmission and an address of a device for reception of a corresponding link in the same manner as the HD DF.

A Case Where the Type of the Frame is the Link Information Request Frame or the Relay Operation Setting and Changing Request Frame
   being the same as the HD DF scheme
   Detour link (②): Address 1=Relay STA Address, Address 2=Source STA Address, Address 3=BSSID
   Detour link (③): Address 1=Destination STA Address, Address 2=Relay STA Address, Address 3=BSSID In this example, examples of the link information request frame or the relay operation setting and changing request frame that that are excluded from the cooperation communication may include an RLS request/response, a link margin request and response frame, and the like.

In this example, when the relay scheme of the relay device is the FD AF scheme, an operation may be changed. When a fact that the frame is transmitted to the relay device is recognized by decoding the MAC header, forwarding of the frame to the destination device may be stopped.

The relay device may encode a frame that is the same as the frame received from the source device, to have a different address, and may transmit the frame to the destination device. In this example, the addressing method may operate similar to the HD DF scheme, and, similarly, a response frame may be transmitted from the destination device to the source device as a situation may demand. When responses with respect to all frames of FIG. 7 are required, the address 1 and the address 2 are exchanged and recorded in the same manner as a rule of recoding an addresses defined by the conventional standard.

When the frame exchanged based on peer-to-peer communication is secured using a pairwise key, as opposed to using a public key, an addressing method different from the described addressing method may be applied. In this example, the pairwise key may denote a pairwise transient key.

In a case where devices maintain security from each other, even though the relay device relays data between the source device and the destination device, the source device and the destination device may not be aware of the corresponding pairwise key and thus, may not decode or encode the received data for transmission.

Conversely, the MAC header may decode the received data or may perform a CRC check and thus, may transmit an acknowledgement (ACK) frame or a blockACK frame that indicates when the frame is damaged. When the relay scheme of the relay device is the HD DF scheme, the address of the source device and the address of the destination device that are targets of the pairwise key may be recorded as the address 1 and the address 2, respectively, unlike the existing HD DF scheme.

When a response with respect to the transmitted frame, a different addressing method may be applied that is different from a method that changes the address 1 and the address 2. An address of a device for transmission and an address of a device for reception of a detour link (② Detour Link or ③ Detour Link) may be written to indicate a device for transmission, as described in FIG. 8.

Information associated with a corresponding link (② Detour Link or ③ Detour Link) may be requested while the data frame is being transmitted, or a management frame may be need to be transmitted to the relay device. In this example, the link information request frame or the relay operation setting and changing request frame may be used as the management frame. Examples of the link information request frame may include an RLS request/response, link margin request/response, and the like.

In the case where the link information request frame or the relay operation setting and changing request frame is transmitted, a public key or a pairwise key between devices of each link may be used since encryption is less important than the data frame.

In this example, addressing may not need to be changed based on the encryption and thus, the same addressing method as the existing HD DF scheme may be used.

In the cooperation communication, when a frame encoded by a pairwise key between the source device and the destination device is received, addresses of targets of the pairwise key, that is, the addresses of the source device and the address of the destination device are recorded as the address 1 and the address 2, respectively.

However, the cooperation communication may combine a frame transmitted to the destination device via a ② Detour Link or ③ Detour Link, and may transmits a response frame by recording the address of the destination device and the address of the source device as the address 1 and the address 2 based on an existing rule, in the same manner as a response in ① Direct Link.

The cooperation communication may use a scheme same as the existing HD DF scheme, to transmit a management frame that is transmitted to the relay device or that requires information associated with a corresponding link, for example, link information request frame, such as the RLS request/response, link margin request/response frame, and the relay operation setting and changing request frame.

In a case of the relay scheme of the relay device is the FD AF scheme, the FD AF scheme is not based on a DF scheme and thus, may not be related to encryption, and several management frames that are decoded and forwarded may avoid the encryption as in the HD DF scheme or in the cooperation communication. Accordingly, this case may also use the same scheme as the existing HD DF scheme. The above described descriptions may be organized in a table of FIG. 8.

Figure 8:
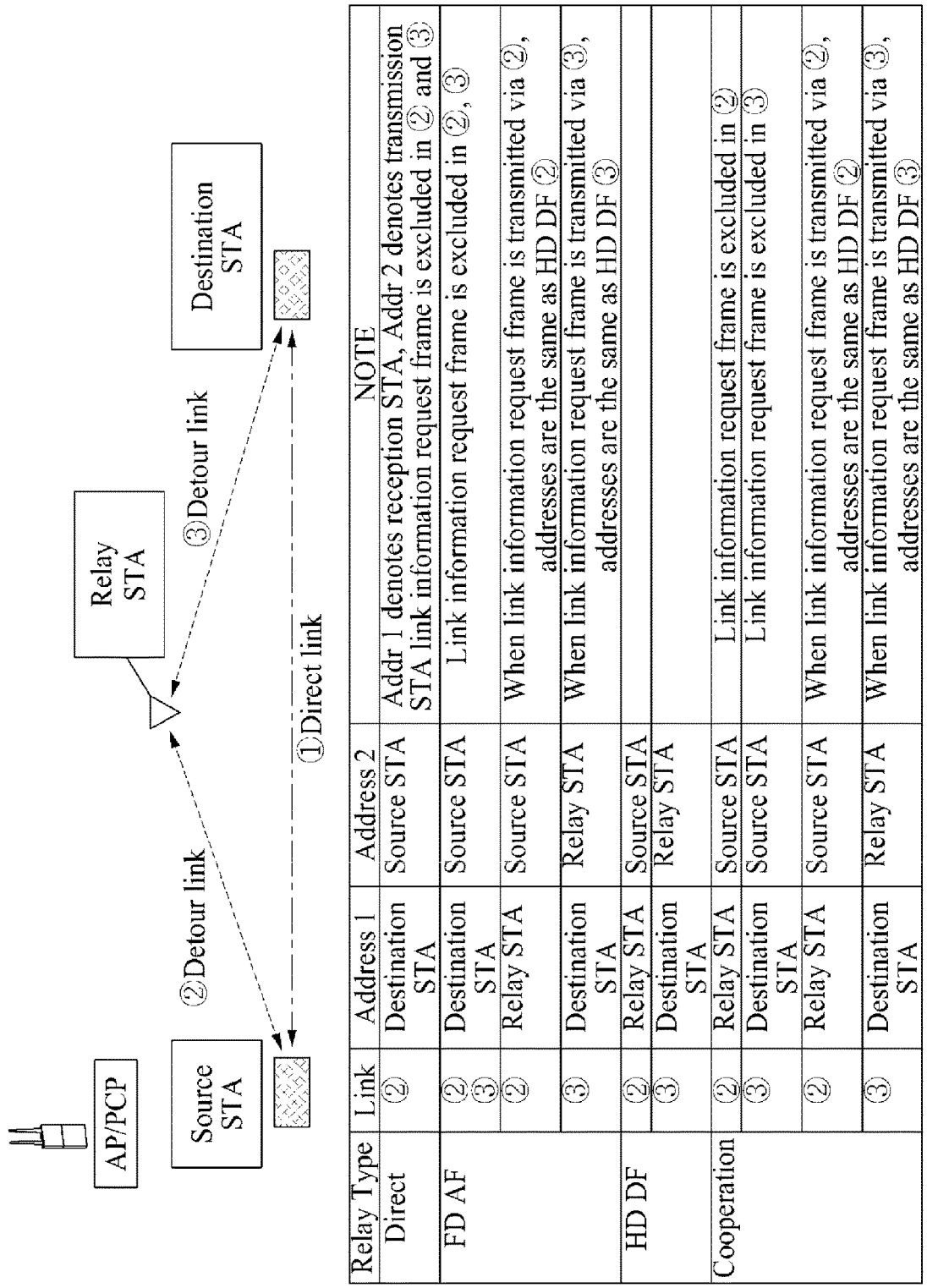
FIG. 8 is a diagram illustrating that an addressing method is changed based on a relay scheme of a relay device or a type of a frame relayed via the relay device according to an embodiment of the present invention.

FIG. 8 illustrates that an addressing method is changed based on a relay scheme of a relay device or a type of a frame relayed via the relay device according to an embodiment of the present invention.

A direction of frame transmission based on an FD AF scheme and a direction of frame transmission based on an HD DF scheme may be different based on the relay scheme of the relay device. The addressing method may be changed based on whether a frame relayed via the relay device is a data frame, a control frame, or a management frame that requires information of a corresponding link.

Therefore, the source device may use a different addressing method based on the relay scheme or the type of the frame relayed via the relay device.

A method of the source device that changes the addressing method for each case will be described.

Half Duplex DF Relay
Frame type: the data frame, the control frame, and the management frame excluding a link information request frame or a relay operation setting and changing request frame
Detour link (②, ③): Address 1=Destination STA Address, Address 2=Source STA Address, Address 3=BSSID
Frame type: a response frame
Detour link (② response): Address 1=Source STA Address, Address 2=Relay STA Address, Address 3=BSSID
Detour link (③ response): Address 1=Relay STA Address, Address 2=Destination STA Address, Address 3=BSSID
Frame type: the link information request frame or the relay operation setting and changing request frame
Detour link (②): Address 1=Relay STA Address, Address 2=Source STA Address, Address 3=BSSID
Detour link (③): Address 1=Destination STA Address, Address 2=Relay STA Address, Address 3=BSSID
Cooperation Communication
Frame type: the data frame, the control frame, and the management frame excluding the link information request frame and the relay operation setting and changing request frame
Detour link (②, ③): Address 1=Destination STA Address, Address 2=Source STA Address, Address 3=BSSID
Frame type: a response frame
Detour link (② response, ③ response) Address 1=Source STA Address, Address 2=Destination STA Address, Address 3=BSSID
Frame type: the ink information request frame or the relay operation setting and changing request frame (RLS request/response, Link Margin request/response)
Detour link (②): Address 1=Relay STA Address, Address 2=Source STA Address, Address 3=BSSID
Detour link (③): Address 1=Destination STA Address, Address 2=Relay STA Address, Address 3=BSSID
Full Duplex AF Relay
Frame type: the data frame, the control frame, and the management frame excluding the link information request frame or the relay operation setting and changing request frame
Detour link (②, ③): Address 1=Destination STA Address, Address 2=Source STA Address, Address 3=BSSID
Frame type: the link information request frame or the relay operation setting and changing request frame (RLS request/response, Link Margin request/response) being same as the HD DF scheme
Detour link (②): Address 1=Relay STA Address, Address 2=Source STA Address, Address 3=BSSID
Detour link (③): Address 1=Destination STA Address, Address 2=Relay STA Address, Address 3=BSSID A method of allocating a reservation resource to be used for relaying will be described with reference to FIGS. 9 through 11.

In the WLAN and the WPAN, an AP (in a case of the WLAN) or a pico-net coordinator (PNC) (in a case of the WPAN) may classify a time period into a contention-based period and a non-contention based period, and thus data may be transmitted based on a contention-based scheme or a non-contention based scheme.

In the contention-based period, all devices in the network may compete for a channel based on a carrier sense multiple access with collision avoidance (CSMA/CA) scheme. In the non-contention based period, the AP or the PNC uses a polling scheme or a scheduling information transmission scheme and, may provide, to a corresponding device, a method for transmission data at a predetermined time period in the non-contention based period.

A system, such as the ECMA 368 and 387, that does not include a coordinator and uses a distributed MAC, may also use a scheme that broadcasts scheduling information and reserves a predetermined time period in the non-contention based period that is not used by another device.

According to an embodiment of the present invention, there may be provided a method of requesting a reservation resource and allocating the reserved resource that may transmit a frame transmitted based on a peer-to-peer scheme in a direct link and may transmit the frame via a relay device. Hereinafter, a case where the coordinator exists based on the IEEE 802.11 WLAN will be described.

A device requesting a peer communication may be referred to as a source device, a device responding to the request for the peer communication may be referred to as a destination device, and a device relaying a frame between the two devices may be referred to as a relay device.

It is assumed that an initiation process required for the three devices has been completed.

The source device may plan to request, from the coordinator, reservation of a resource that may transmit data to the destination device via the relay device. Even through the present embodiment describes the AP of the WLAN as the coordinator, the coordinator may not be limited thereto, and devices that support a function of the AP may be used as the coordinator.

Generally, to distinguish the resource, an initiator ID corresponding to an ID of a device that requests the resource, and a responder ID corresponding to an ID of a device with which the initiator plans to communicate may be provided. Depending on cases, an initiator may transmit, to the AP, a frame requesting the resource and thus, the initiator may omit the initiator ID from a field transmitted when the initiator requests the resource.

In 802.11e, a traffic ID may be added to differently apply a QoS based on characteristic of transmitted data. In addition, the resource may be requested using an add traffic stream (ADDTS) request frame including a TSPEF IE field that defines a parameter associated with traffic, or a traffic stream (TS) may be set after negotiation with the AP.

To transmit data after the TS is set, the initiator may obtain a polled transmission opportunity (TXOP) of a hybrid coordination function for supporting QoS (HCCA) or a TXOP of an enhanced distributed channel access (EDCA), or may use a power save multi poll (PSMP) of the 802.11n.

The 802.11 standard does not state the method that requests and allocates a period for a peer-to-peer scheme in the non-contention based period. A scheme that uses a channel time allocation (CTA) of the 802.15 that performs reservation for the peer-to-peer scheme, and a scheme that uses a distributed reservation protocol (DRP) of the ECMA 368 and 387 may not include relaying traffic of the peer-to-peer scheme.

A general reservation scheme may include, in a frame, an initiator ID corresponding to an ID or an address for identifying a device, or a responder ID. A frame indicating allocation may include the initiator ID, the responder ID, a start time of the allocated time, and a duration, and thus the allocated period may be identified by the IDs.

Therefore, the 802.11 may use the same scheme. Also, even though the IDs the same, a class of traffic may be different and thus, a traffic ID (TID) may be added. The coordinator may broadcast the allocated information using a beacon frame or an announcement frame.

The devices may check whether IDs of the devices exists among the allocated resource, and, when the IDs exist, the devices may transmit data in the allocated period. In this example, use of the initiator ID and the responder ID may indicate that the reserved period is allowed only for the two devices.

Therefore, when the relay device transmits and receives the data, a new field may be required. There may be various methods of requesting and allocating a reservation resource including a relay function, First, when the source device requests, from the AP, a resource that supports relaying, a field requesting the resource and a field indicating the resource may be provided together, which will be described with reference to FIG. 9.

Figure 9:
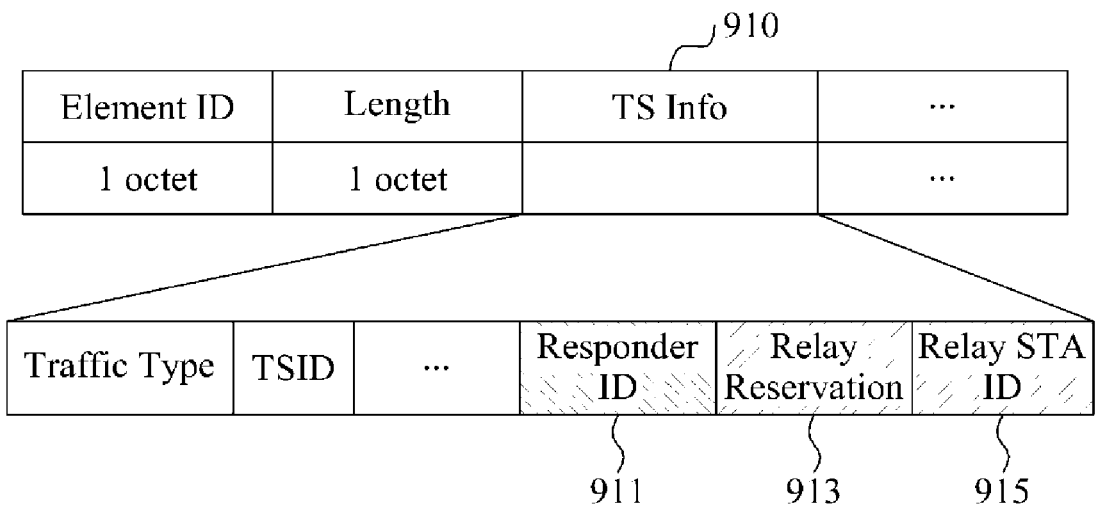
FIG. 9 is a diagram illustrating an add traffic stream (ADDTS) request frame body and a corrected traffic specification (TSPEC) information element (IE) according to an embodiment of the present invention.

FIG. 9 illustrates an ADDTS request frame body and a corrected traffic specification (TSPEC) IE according to an embodiment of the present invention.

Referring to FIG. 9, a responder ID field 911, a relay reservation field 913, and a relay ID 915 field are inserted in a TS Info 910 of a TSPEC IE that is inserted in the ADDTS request frame.

In this example, when the relay reservation field 913 is activated, the requested reservation resource uses a relay function, and when the corresponding field is activated, the relay device ID field 915 may be needed. When allocated resource information is broadcasted, the relay reservation field 913 and the relay device ID field 915 may be added, and a field value may be copied and transmitted to a device requesting the field value.

The responder ID field 911 may denote an ID of a responder when peer-to-peer transmission is performed in the requested resource. The relay reservation field 913 may indicate that the corresponding frame may be transmitted via a relay device.

The relay device ID field 915 may be used when the AP announces, to other devices, an ID of the relay device relaying the corresponding frame. A coordinator, such as the AP, may announce the ID of the relay device by inserting an allocation schedule IE in a beacon frame or an announce frame.

The allocation resource information may be recorded in an allocation field, and an allocation control field may describe characteristic of allocated resources. The relay reservation field 913 and the relay device ID field 915 may be newly added fields for the relay function, which will be described with reference to FIG. 10.

Figure 10:
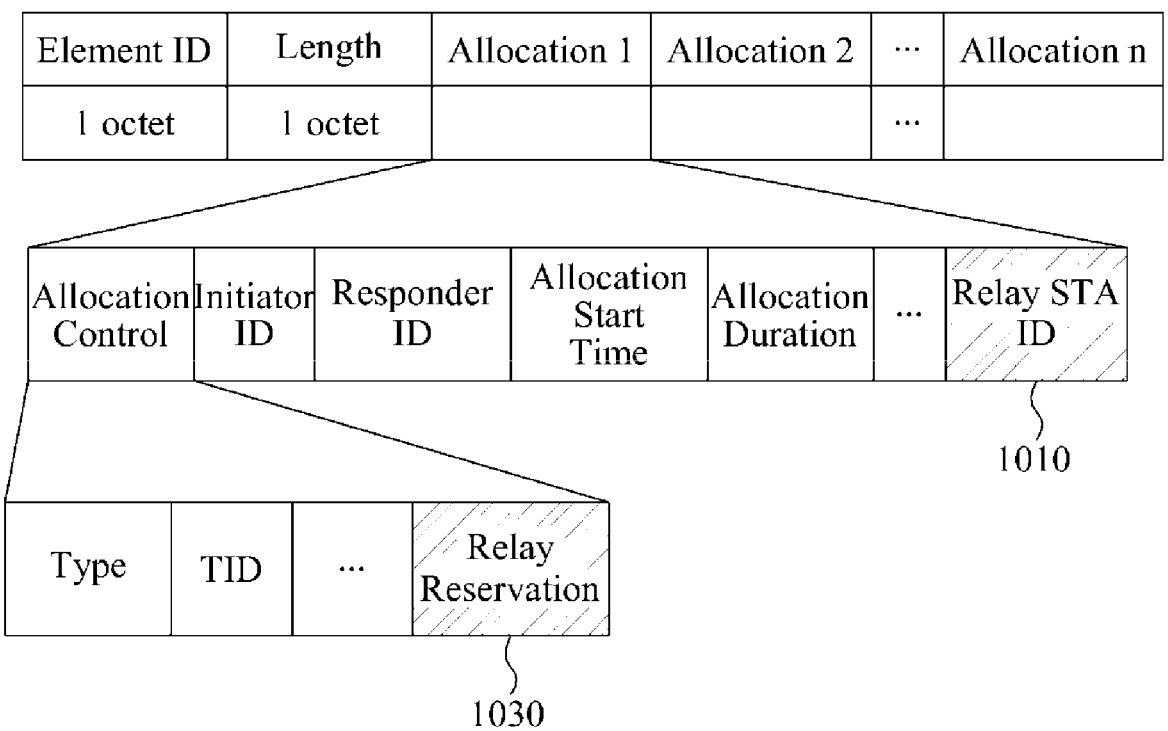
FIG. 10 is a diagram illustrating an allocation schedule IE associated with FIG. 9, an allocation field, and an allocation control field frame body.

FIG. 10 illustrates an allocation schedule IE associated with FIG. 9, an allocation field, and an allocation control field frame body.

Referring to FIG. 10, resource allocation information for a peer-to-peer scheme in a non-contention based scheme may be described based on the allocation schedule IE. In this example, the resource allocation information may be inserted based on an allocation field for each allocation, and fields, such as an allocation start time of the resource allocated in the allocation field, an initiator ID, a responder ID, and the like may be described. In this example, the relay device ID field 1010 and the relay reservation field 1030 may be described.

According to the first method, a new field is added to an existing field, and the new field may be added for resource reservation that does not use the relay function.

According to the second method, the existing resource reservation states IDs of two devices in the peer-to-peer communication and thus, when data is transmitted via the relay device, an S-R link and an R-D link may be used in addition to an S-D link between a source device and a destination device. Therefore, reservation request for two resources may be added to use the added two links (the S-R link and the R-D link) and thus, the TSPEC IE may be added when the ADDTS request frame is transmitted to the AP.

However, when only the destination ID field exists and the source ID field does not exist in the TSPEC IE, three pairs of IDs for the three links may not be included. When only the destination ID field exists and the source ID field does not exist in the TSPEC IE, the AP may recognizes an ID of the source device based on a transmitting address included in a request frame and thus, it is more effective.

Therefore, the source device inserts two TSPEC IEs indicating the S-D link and the S-R link in a single ADDTS request frame. The relay device may additionally transmit an ADDTS request frame to request a resource of the R-D link. When the source device calculates a resource allocation time expended for transmitting the ADDTS request frame, the source device may need an application data rate, a rate in a physical layer (PHY), and capability information.

When the information associated with the resource allocation time is transmitted using the ADTS request frame, the relay device may need to transmit the same information and thus, an additional signaling that transmits information from the source device to the relay device may be required.

In a position of the AP, the transmission of the ADDTS request frame of the relay device is later than the transmission of the ADDTS request frame of the source device, and depending on cases, the relay device may not request the ADDTS request frame in the same beacon frame (or super frame period). However, the AP may need to delay scheduling until the AP receives the ADDTS request frame from the relay device.

The following methods may be used to prevent the AP from delaying the scheduling.

When a source device on which a relay operation is set requests transmission of an ADDTS request frame from a destination device on which the relay operation is set, the AP may logically allocate and broadcast three resources. As described above, when the relay operation is set on the source device, the source device announces, to the AP, the setting of the relay operation and IDs of three devices participating in the relaying. Accordingly, the AP may be aware of the ID of the relay device and thus, may allocate the three resources.

In this example, the allocated resource may be a single resource that physically has the same start time and the same duration length and thus, information associated with the allocated resource may be the same excluding information associated with an initiator ID and a responder ID.

Accordingly, three allocation fields may be configured and inserted using the allocation schedule IE of FIG. 10.

The three allocation fields may have the same fields excluding the initiator ID and responder ID. The different two files may denote a pair of devices using a link.

The three devices that receive the allocation schedule IE may detect three allocation fields, and when three pairs of initiator ID and responder ID of the three fields indicate a combination of the IDs of the three devices, that is, (S,D), (S,R), and (R,D), data transmission is performed during an allocated duration. In this example, the data may be used during relaying via the relay device, and the IDs of the three devices may be IDs of devices that are set for relaying operation together.

According to the three described methods, an additional field may be used (first method), and even through a single resource is allocated, two ADDTS frames (second method) may be transmitted or three pieces of allocation information (third method) may be required, and thus the method of requesting and allocating a reservation resource may be redundant.

A process that uses an existing resource reservation and allocation, to request and allocate the reservation resource will be described.

FIG. 11 illustrates a frame structure to be used for requesting reservation of a resource and allocating the reservation resource.

A source device and a destination device may be set to use a relay device and a relay function, and may announce the setup to an AP.

The source device requests a resource from the AP and broadcasts allocated resource period information. In this example, the broadcasted allocation information may include an ID of the source device and an ID of the destination device. Accordingly, the relay device may check the IDs of the two devices, and, when the IDs of the devices are identical to IDs of two devices that are set to use the relay device as a relay, the relay device may move to the corresponding period to operate a relay operation.

Basically, data transmission is not allowed for the relay device. Therefore, the source device may transmit, using an 11n reverse direction protocol, a reverse direction grant frame to allow a device different from the destination device to transmit data in a resource of the source device, and the relay device that receives authority may perform relaying and may return the grant frame to the source device. In this example, the grant frame is continuously transmitted to the relay device, and data or an ACK may not be transmitted while the grant frame is transmitted and thus, resources may be wasted.

However, the relay device may not be a destination in the reservation resource using the relay function. Therefore, the relay device may respond to a received frame that is received since an address of the relay device is set as an address of a reception device, or may relay the received frame to a remaining device, for example, a destination device. In this example, the grant frame may not be used.

The method according to the above-described embodiments of the present invention may be recorded in non-transitory computer readable media including program instructions to implement various operations embodied by a computer. The media may also include, alone or in combination with the program instructions, data files, data structures, and the like. Examples of non-transitory computer readable media include magnetic media such as hard disks, floppy disks, and magnetic tape; optical media such as CD ROM discs and DVDs; magneto-optical media such as floptical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A communication method performed by a source device, the method comprising:
    sending an RLS (Relay Link Setup) request frame to a relay device for an RLS process;
    receiving an RLS response frame from the relay device; and
    transmitting an RLS announcement frame to indicate successfully performing the RLS process to a coordinator including a PCP (Personal BSS control point) or AP (Access point),
    wherein the coordinator transmits an announce frame or beacon frame including an extended schedule element for a service period to the relay device, wherein the extended schedule element includes a plurality of allocation fields related to (i) allocation control, (ii) a source association ID (AID) for the source device, (iii) a destination AID for a destination device, (iv) allocation start, (v) allocation block duration, (vi) BF control, (vii) number of blocks, and (viii) allocation block period,
    wherein the source device, the relay device and the destination device exchange a frame in a data transfer time comprising a contention-based access period and the service period,
    wherein the exchanged frame includes (i) a frame control field for control of a MAC frame, and (ii) an address field for an address of an initiator and an address of a responder, and
    wherein the address field is set to addresses of the source device, the relay device, the destination device and a BSSID.

2. The communication method of claim 1, wherein a resource for transmitting a frame from the source device to the destination device via the relay device is requested to enable a frame that the source device transmits using an add traffic stream (ADDTS) request frame to the destination device to be relayed via the relay device.

3. The communication method of claim 2, wherein the ADDTS request frame includes a corrected traffic specification (TSPEC) and is transmitted to set a traffic stream.

4. The method of claim 3, wherein the TSPEC includes element ID, length, and traffic stream Info (TS Info).

5. The method of claim 1, wherein the relay device relays a frame corresponding to the RLS request frame to the destination device using a relay scheme including Full Duplex Amplify and Forward (FD-AF) or Half Duplex Decode and Forward (HD-DF).

6. A source device for performing a communication method, the source device comprising:
one or more processors configured to:
send an RLS(Relay Link Setup) request frame to a relay device for an RLS process;
receive an RLS response frame from the relay device; and
transmit an RLS announcement frame to indicate successfully performing the RLS process to a coordinator including a PCP (Personal BSS control point) or AP (Access point),
wherein the coordinator transmits an announce frame or beacon frame including an extended schedule element for a service period into the relay device, wherein the extended schedule element includes a plurality of allocation fields related to (i) allocation control, (ii) a source association ID (AID) for the source device, (iii) a destination AID for a destination device, (iv) allocation start, (v) allocation block duration, (vi) BF control, (vii) number of blocks, and (viii) allocation block period,
wherein the source device, the relay device and the destination device exchange a frame in a data transfer time comprising a contention-based access period and the service period,
wherein the exchanged frame includes (i) a frame control field for control of a MAC frame, and (ii) an address field for an address of an initiator and an address of a responder, and
wherein the address field is set to addresses of the source device, the relay device, the destination device and a BSSID.

7. The source device of claim 6, wherein a resource for transmitting frame from the source device to the destination device via the relay device is requested to enable a frame that the source device transmits using an add traffic stream (ADDTS) request frame to the destination device to be relayed via the relay device.

8. The source device of claim 7, wherein the ADDTS request frame includes a corrected traffic specification (TSPEC) and is transmitted to set a traffic stream.

9. The source device of claim 8, wherein the TSPEC includes element ID, length, and traffic stream Info (TS Info).

10. The method of claim 6, wherein the relay device relays a frame corresponding to the RLS request frame to the destination device using relay scheme including Full Duplex Amplify and Forward (FD-AF) or Half Duplex Decode and Forward (HD-DF).

* * * * *